US007015825B2

(12) United States Patent
Callahan

(10) Patent No.: US 7,015,825 B2
(45) Date of Patent: Mar. 21, 2006

(54) DECORATIVE LIGHTING SYSTEM AND DECORATIVE ILLUMINATION DEVICE

(75) Inventor: Jeffrey Scott Callahan, Hickory, NC (US)

(73) Assignee: Carpenter Decorating Co., Inc., Hickory, NC (US)

(*) Notice: Subject to any disclaimer, the term of this patent is extended or adjusted under 35 U.S.C. 154(b) by 100 days.

(21) Appl. No.: 10/824,519

(22) Filed: Apr. 14, 2004

(65) Prior Publication Data

US 2004/0207341 A1 Oct. 21, 2004

Related U.S. Application Data

(60) Provisional application No. 60/462,727, filed on Apr. 14, 2003.

(51) Int. Cl.
*H08B 5/22* (2006.01)

(52) U.S. Cl. ........................... 340/815.45; 340/815.65; 340/815.66

(58) Field of Classification Search ..................... None
See application file for complete search history.

(56) References Cited

U.S. PATENT DOCUMENTS 3,746,918 A 7/1973 Drucker et al.
3,789,211 A 1/1974 Kramer
3,947,840 A 3/1976 Craford et al.
4,298,869 A 11/1981 Okuno
4,329,625 A 5/1982 Nishizawa et al.
4,367,464 A 1/1983 Kurahashi et al.
4,388,567 A 6/1983 Yamazaki et al.
4,420,711 A 12/1983 Takahashi et al.
4,625,152 A 11/1986 Nakai
4,675,575 A 6/1987 Smith et al.
4,727,289 A 2/1988 Uchida
4,740,882 A 4/1988 Miller
4,845,481 A 7/1989 Havel
4,887,074 A 12/1989 Simon et al.
4,992,704 A 2/1991 Stinson
5,003,227 A 3/1991 Nilssen
5,008,595 A 4/1991 Kazar
5,126,634 A 6/1992 Johnson
5,134,387 A 7/1992 Smith et al.
5,164,715 A 11/1992 Kashiwabara et al.
5,184,114 A 2/1993 Brown
5,226,723 A 7/1993 Chen
5,254,910 A 10/1993 Yang
5,256,948 A 10/1993 Boldin et al.

(Continued)

OTHER PUBLICATIONS

The I²C-Bus Specification, Version 2.1, Jan. 2000, pp. 1-46.

*Primary Examiner*—Tuyet Thi Vo
(74) *Attorney, Agent, or Firm*—Alston & Bird LLP

(57) ABSTRACT

A decorative lighting system includes a command controller, a plurality of illumination devices and a flexible cord interconnecting each. The command controller includes a microcontroller that provides a data signal and a clock signal. The data signal instructs a plurality of addresses corresponding to the lighting devices. Each illumination device has at least three light emitting diodes (LEDs). The LEDs each emit light at a different wavelength than either of the other LEDs. An integrated circuit LED is responsive to the data signal, clock signal, and power signal and drives the first, second, and third LEDs by to a blink rate and intensity. The LED driver includes a plurality of pulse width modulation registers that are selectable in combination to drive the LEDs to a blink rate and intensity independent of one another.

24 Claims, 9 Drawing Sheets

U.S. PATENT DOCUMENTS

| | | | |
|---|---|---|---|
| 5,282,121 A | 1/1994 | Bornhorst et al. | |
| 5,294,865 A | 3/1994 | Haraden | |
| 5,350,977 A | 9/1994 | Hamamoto et al. | |
| 5,357,170 A | 10/1994 | Luchaco et al. | |
| 5,374,876 A | 12/1994 | Horibata et al. | |
| 5,388,357 A | 2/1995 | Malita | |
| 5,404,282 A | 4/1995 | Klinke et al. | |
| 5,406,176 A | 4/1995 | Sugden | |
| 5,410,328 A | 4/1995 | Yoksza et al. | |
| 5,436,535 A | 7/1995 | Yang | |
| 5,442,258 A | 8/1995 | Shibata | |
| 5,463,280 A | 10/1995 | Johnson | |
| 5,504,394 A | 4/1996 | Johnson | |
| 5,504,395 A | 4/1996 | Johnson et al. | |
| 5,545,950 A | 8/1996 | Cho | |
| 5,561,346 A | 10/1996 | Byrne | |
| 5,575,459 A | 11/1996 | Anderson | |
| 5,592,051 A | 1/1997 | Korkala | |
| 5,681,756 A | 10/1997 | Norman et al. | |
| 5,751,118 A | 5/1998 | Mortimer | |
| 5,821,685 A | 10/1998 | Peterson | |
| 5,821,695 A | 10/1998 | Vilanilam et al. | |
| 6,016,038 A | 1/2000 | Mueller et al. | |
| 6,150,774 A | 11/2000 | Mueller et al. | |
| 6,208,073 B1 | 3/2001 | Wang et al. | |
| 6,211,626 B1 | 4/2001 | Lys et al. | |
| 6,340,868 B1 | 1/2002 | Lys et al. | |
| 6,357,889 B1 | 3/2002 | Duggal et al. | |
| 2001/0033488 A1 | 10/2001 | Chliwnyj et al. | |
| 2004/0160199 A1 * | 8/2004 | Morgan et al. | 315/312 |
| 2004/0245946 A1 * | 12/2004 | Halter | 315/312 |

* cited by examiner

DECORATIVE LIGHTING SYSTEM AND DECORATIVE ILLUMINATION DEVICE

CROSS-REFERENCE TO RELATED APPLICATIONS

This application claims the benefit of U.S. Provisional Application No. 60/462,727 filed Apr. 14, 2003, which is hereby incorporated by reference.

FIELD OF THE INVENTION

The invention relates generally to decorative lighting systems and decorative illumination devices, and, more particularly, to individually addressed decorative LEDs used in lighting systems controlled by a remotely located micro-controller.

BACKGROUND OF THE INVENTION

Lighting system designers have only recently incorporated highly luminous light emitting diodes into conventional lighting systems. Advances in the luminosity of LEDs and white light emitting LEDs will permit large scale applications of LEDs in replacement of other conventional light sources. Light emitting diodes provide advantages over previous incandescent and other types of lighting systems due to improved power conservation and reliability. In the context of decorative lighting system, LEDs permit more latitude of control over the decorative product solutions by permitting communication with LEDs through control systems.

Applications of LEDs in decorative lighting systems have progressed slowly and incorporate minimal controls over the LEDs to control only a few dynamic effects. Some prior art systems have incorporated traditional lighting system protocols, such as used for stage lighting, etc., to control LED dynamic effects. These controls, however, were designed for conventional systems and are therefore less robust for controlling LEDs. Because LEDs permit a greater dynamic range of control, there is a need in the art for control of LEDs for decorative lighting applications with greater latitude of dynamic control.

SUMMARY OF THE INVENTION

According to one embodiment of the invention, a decorative lighting system comprises a command controller, a plurality of lighting devices and a flexible cord interconnecting each. The command controller generally comprises a microcontroller for providing a data signal and a clock signal. The data signal typically includes instructions related to a plurality of addresses corresponding to the lighting devices. A power supply on the command controller provides a power signal for powering the pluralities of illumination devices. The flexible cord comprises at least two conductors capable of carrying the data signal, clock signal, and power signal from the command controller. The plurality of illumination devices are disposed along the flexible cord.

Also according to this embodiment, each illumination device comprises a substrate including a first, a second, and a third light emitting diode (LED). The LEDs each emit light at a different wavelength than either of the other LEDs. An integrated circuit LED driver is disposed on the illumination device and is electrically interconnected via the at least two conductors to the command controller. The integrated circuit is responsive to the data signal, clock signal, and power signal and drives the first, second, and third LEDs by to a blink rate and intensity. One embodiment of the integrated circuit includes a plurality of pulse width modulation registers that are selectable in combination to drive the LEDs to a blink rate and intensity independent of one another. An electronically programmed address circuit on the integrated circuit stores an address so that the LED driver is responsive to the data signal corresponding address from the command controller.

BRIEF DESCRIPTION OF THE SEVERAL VIEWS OF THE DRAWINGS

Figure 1:
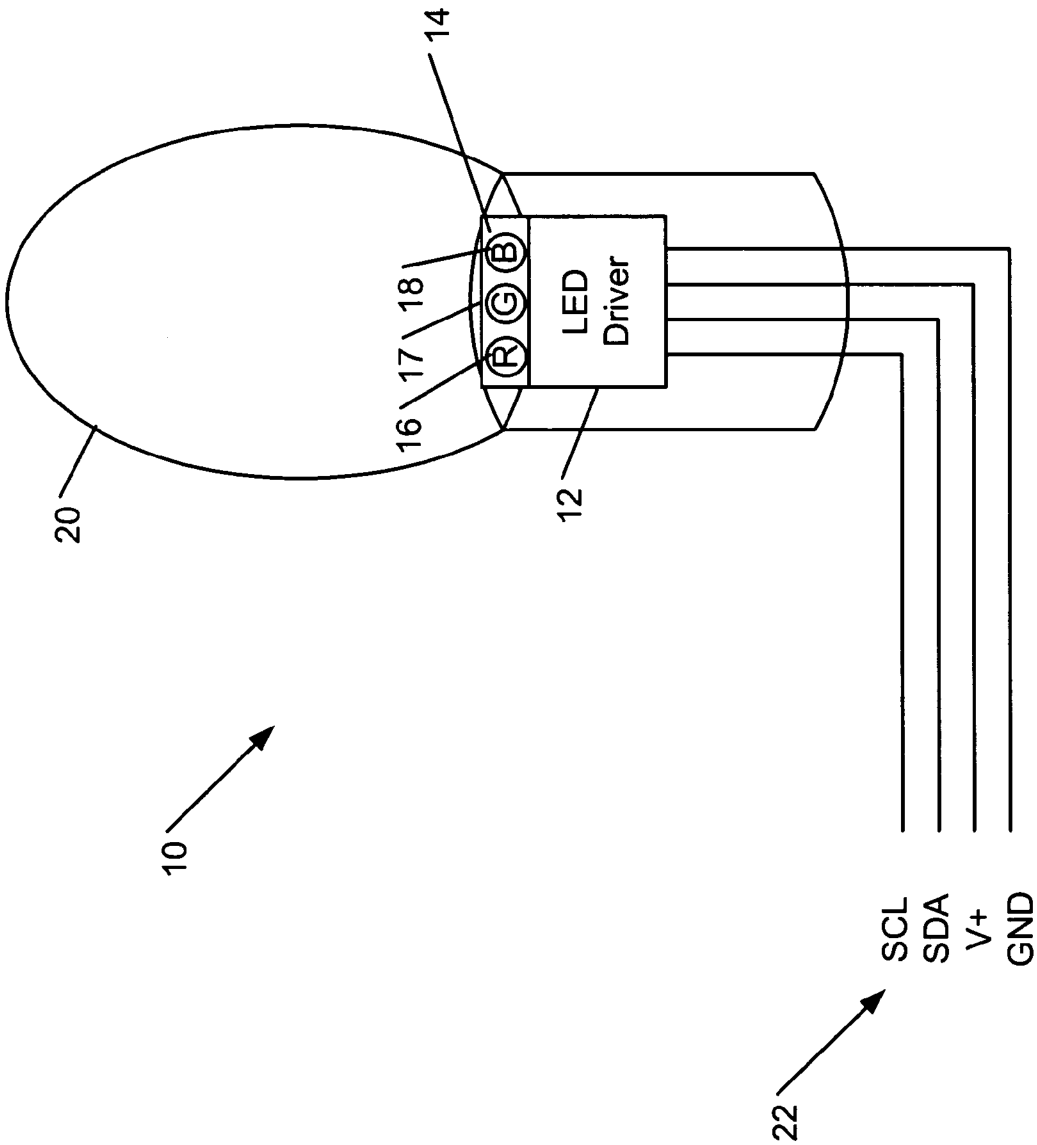
Figure 2:
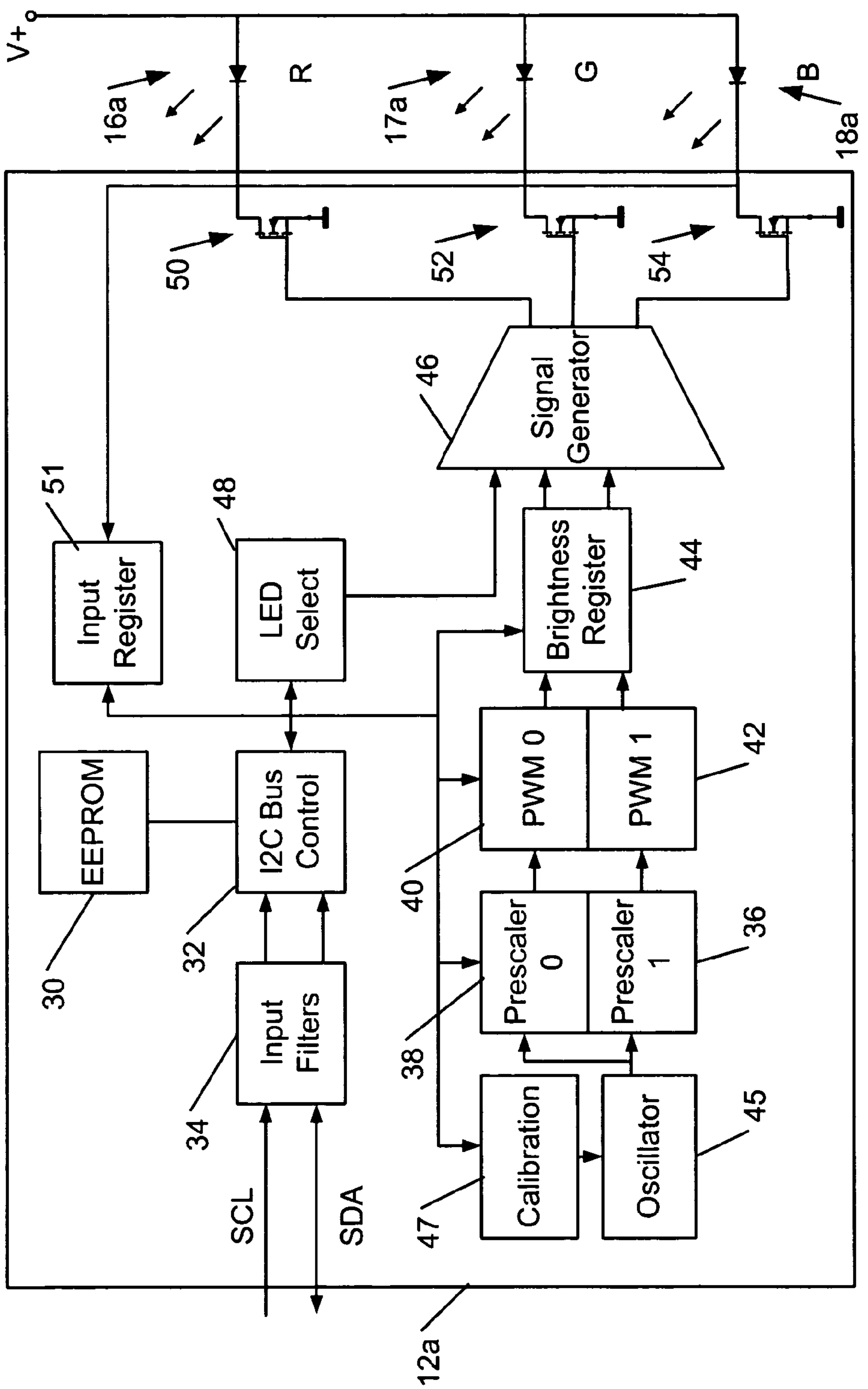
Figure 3:
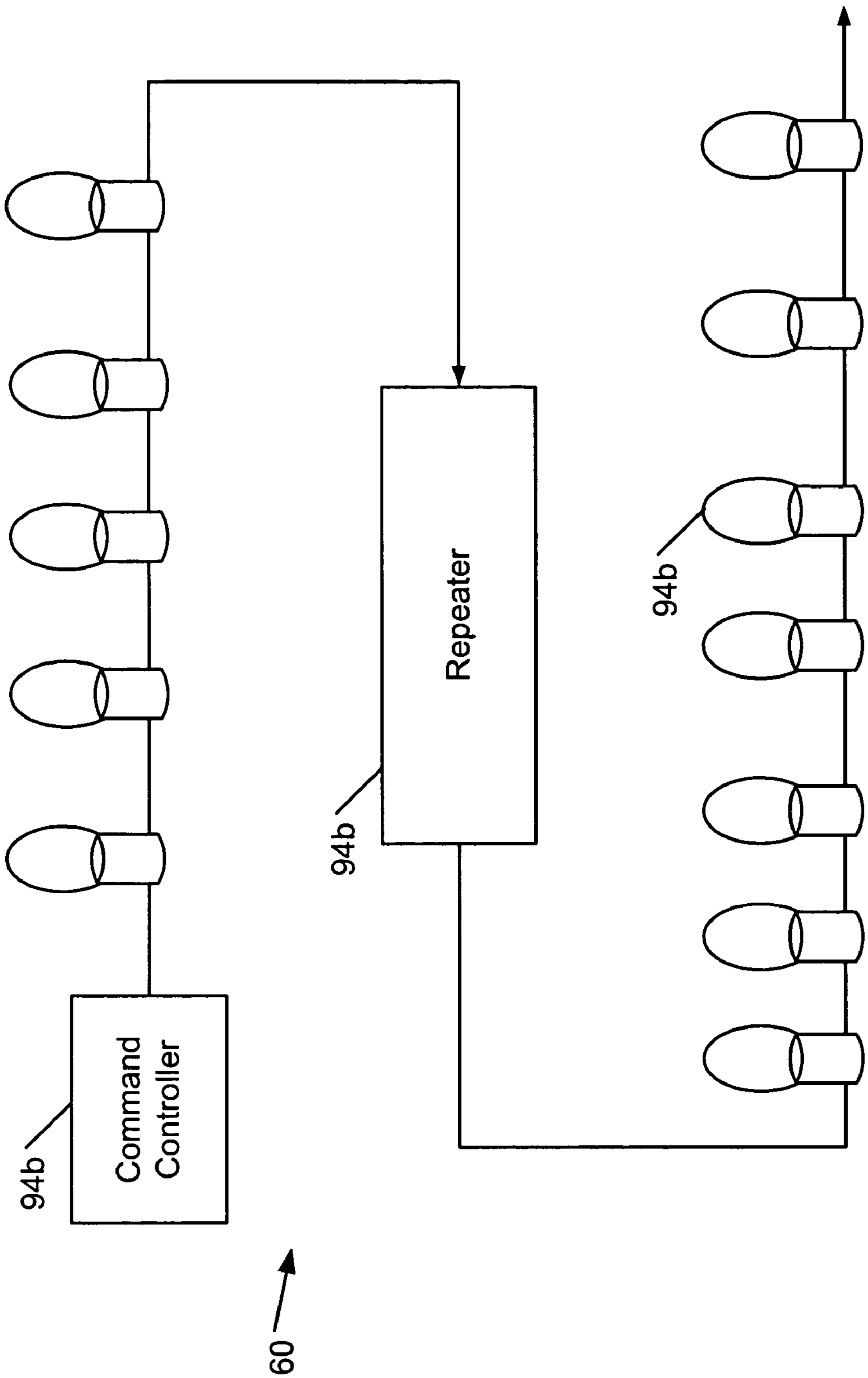
Figure 4:
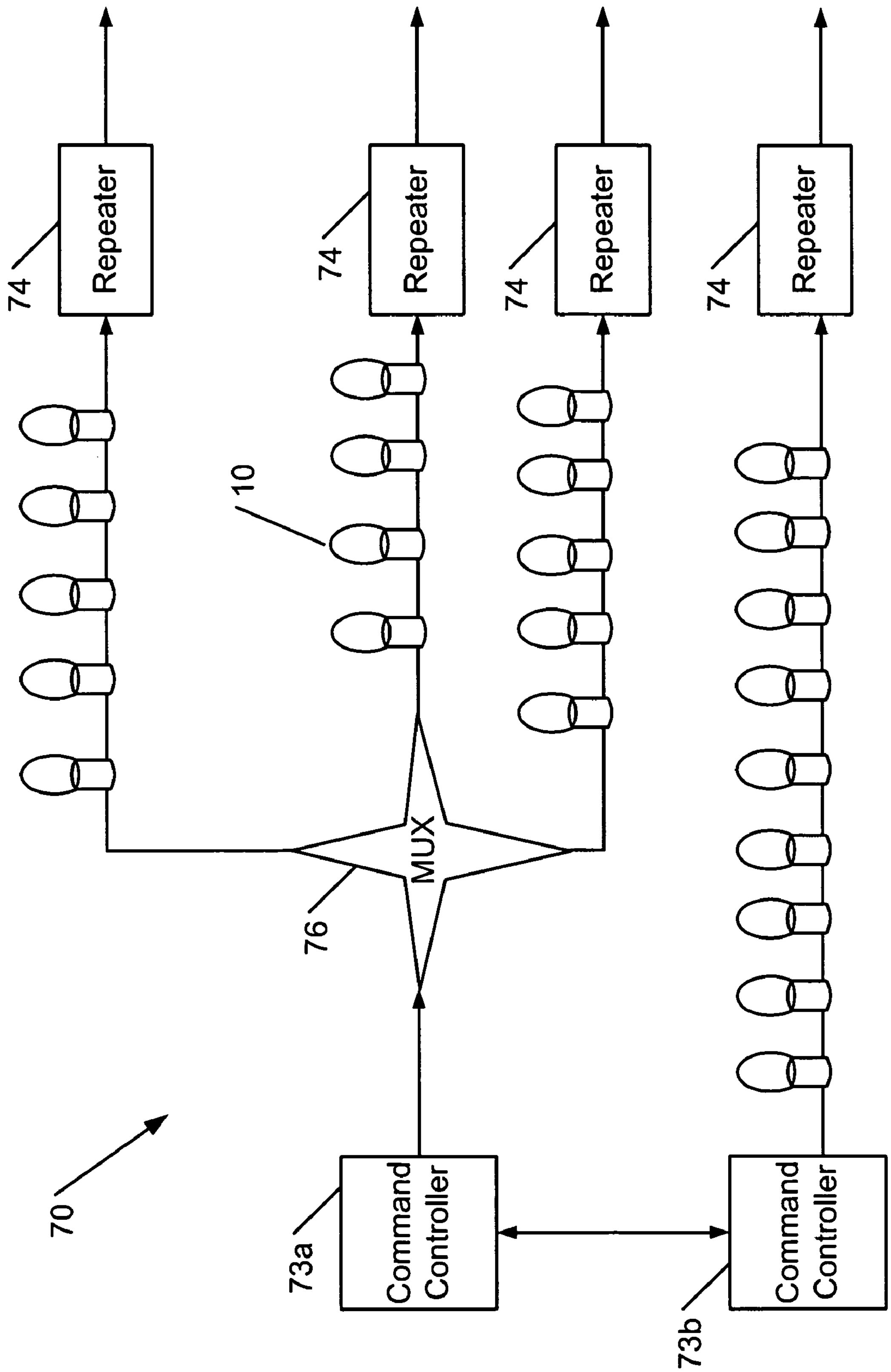
Figure 5:
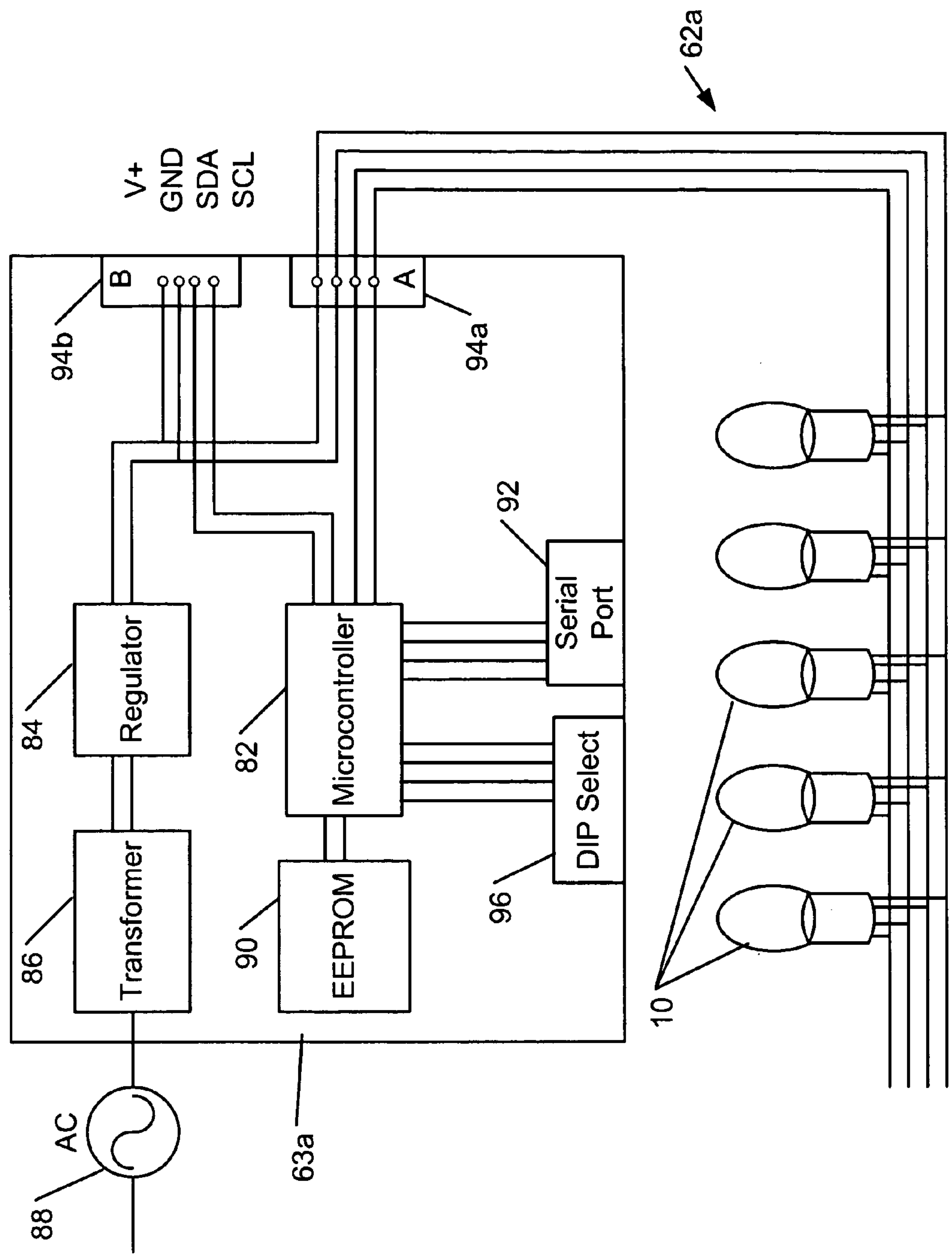
Figure 6:
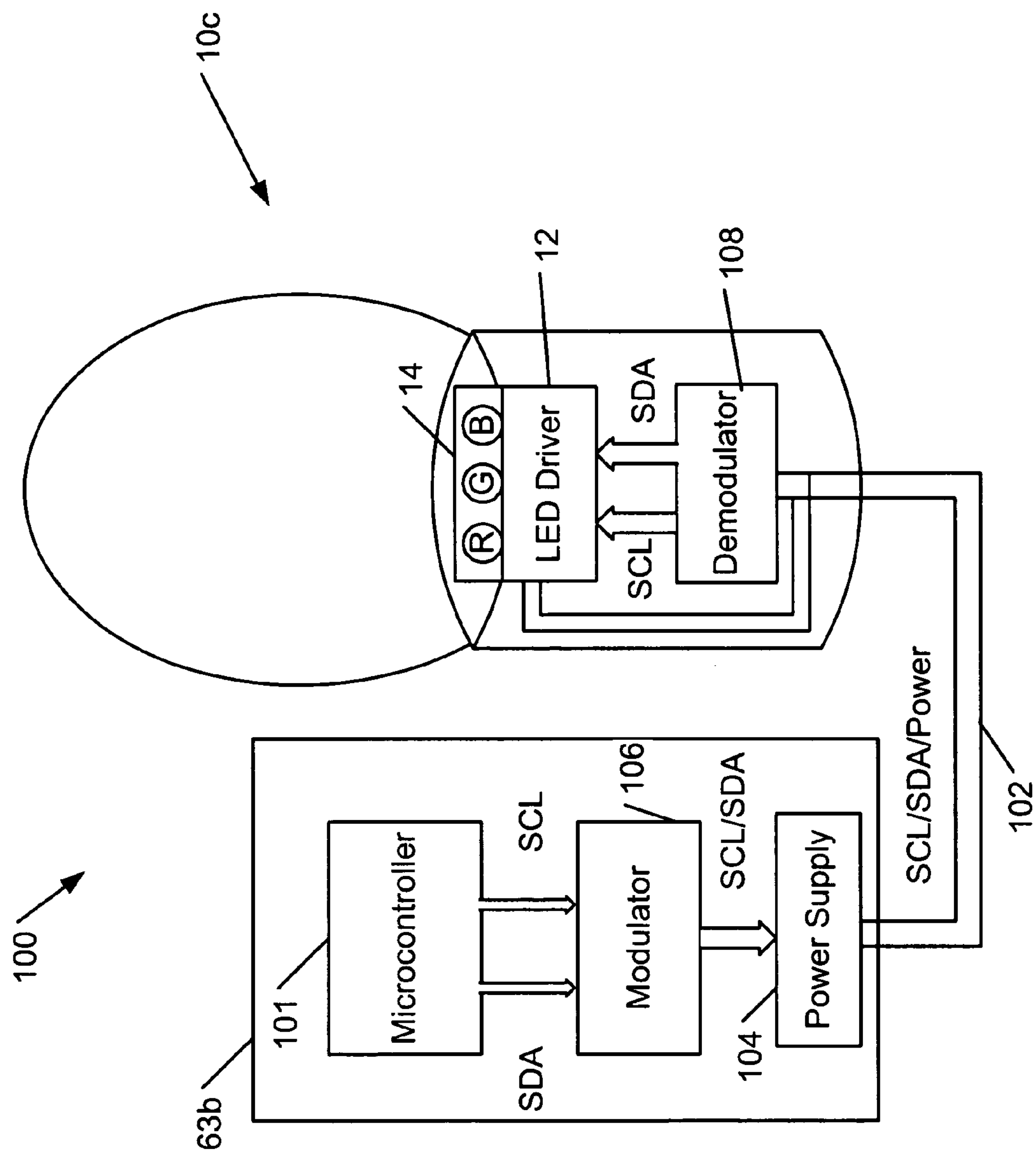
Figure 7:
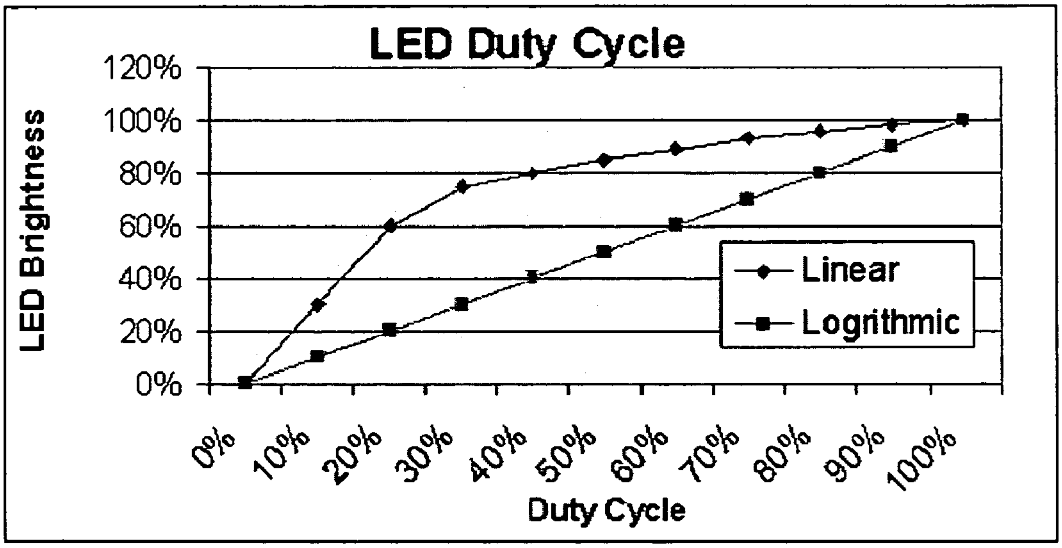
Figure 8:
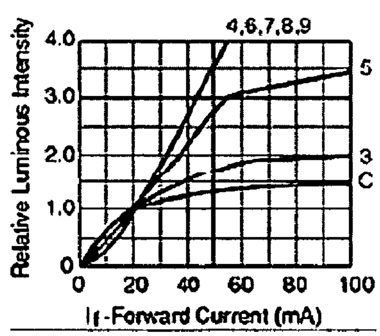
Figure 9:
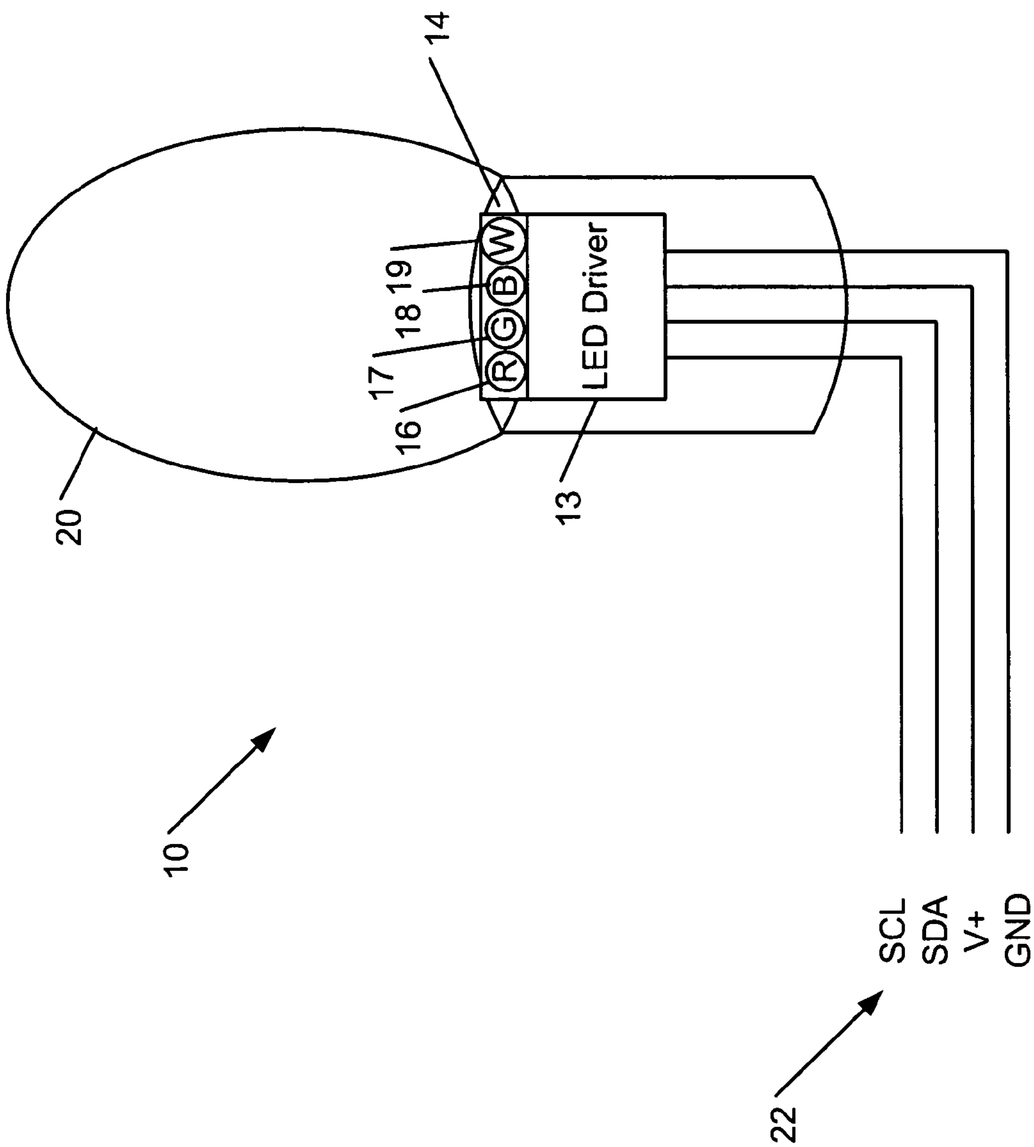
Figure 10:
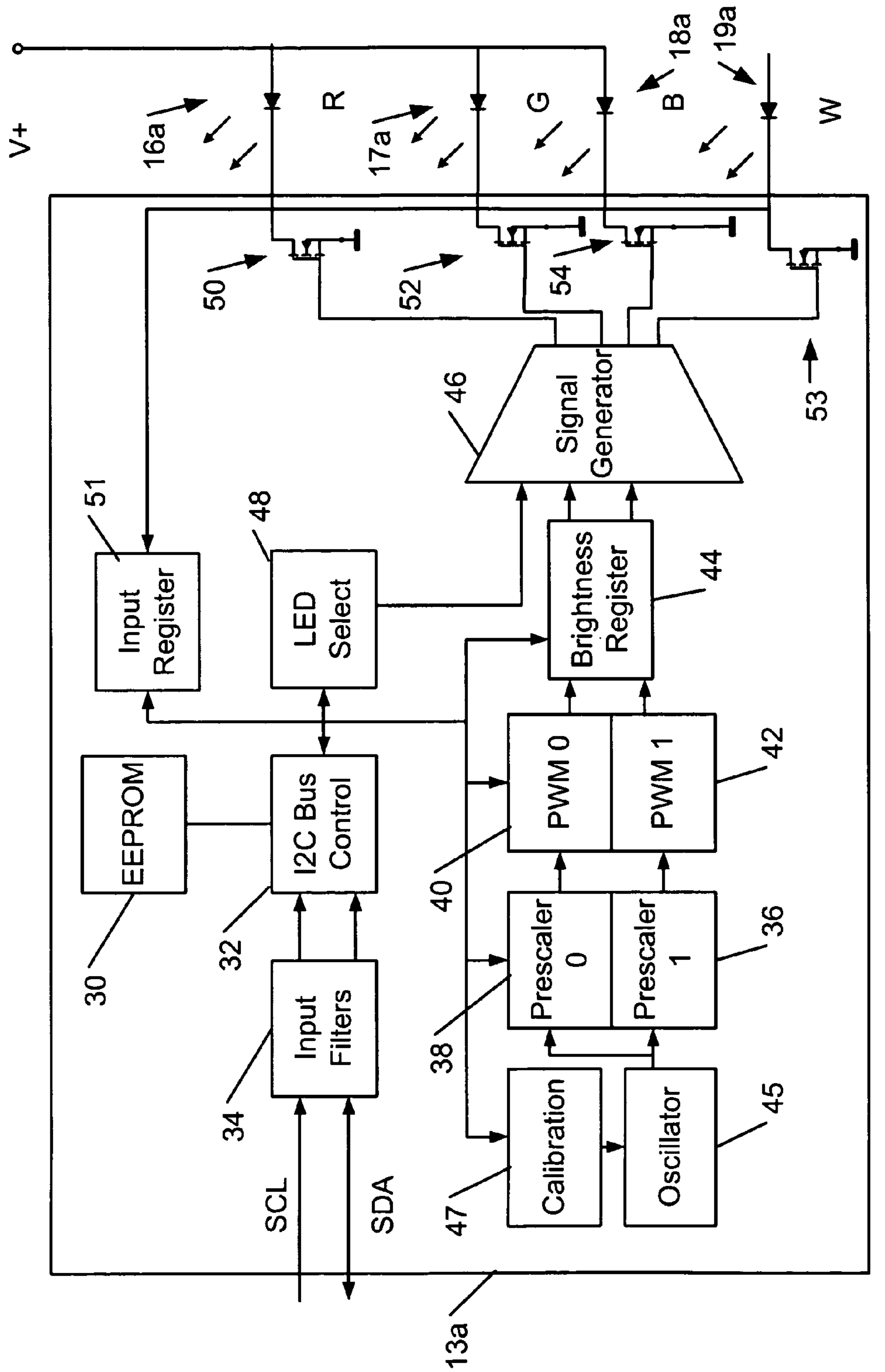

Having thus described the invention in general terms, reference will now be made to the accompanying drawings, which are not necessarily drawn to scale, and wherein:

FIG. 1 is an illumination device for a decorative lighting system according to one embodiment of the present invention;

FIG. 2 is an application specific integrated circuit for driving RGB LEDs according to one embodiment of the present invention;

FIGS. 3 and 4 are decorative lighting systems according to alternative embodiments of the present invention;

FIG. 5 is a command controller and a decorative lighting system according to one embodiment of the present invention;

FIG. 6 is an alternative command controller and an illumination device for use in a decorative lighting system according to one embodiment of the present invention;

FIG. 7 is a brightness diagram contrasting linear and logarithmic pulse width modulation control of LEDs;

FIG. 8 is a diagram illustrating current bias and luminosity for several high brightness LEDs;

FIG. 9 is an illumination device for a RGBW decorative lighting system according to one embodiment of the present invention; and FIG. 10 is an application specific integrated circuit for driving RGBW LEDs according to one embodiment of the present invention.

DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, an illumination device 10 for a decorative lighting system is illustrated. The illumination device 10 includes an application specific integrated circuit light emitting diode (LED) driver 12 for individual and precise control of high brightness decorative color tunable LEDs. The color tunable LED in this embodiment is Red-Green-Blue (RGB) LEDs 14 within an optical bulb. Alternative color tunable LED assemblies, not necessarily limited to RGB LEDs, are also known to those of ordinary skill and may be substituted accordingly. These include phosphor coated multi-wavelength producing LEDS, single color producing multiple LEDs, Red-Green-Blue-Amber (RGBA), Red-Green-Blue-Yellow (RGBY), etc. According to one embodiment of an illumination device, variable color, blink rates, and brightness of a single-dye RGB LEDs are controlled via an $I^2C$ communicating integrated circuit, the LED driver. The RGB LEDs are typically a high brightness LED of InGaN, AlGaN, AlInGaP, or similar high brightness LED Red-Green-Blue light emitting diode elements 16, 17, 18 custom fabricated on a single 5 mm LED package.

An optical diffuser 20 encloses the RGB LEDs and approximates the size and shape of a Christmas bulb, as commonly found in decorative applications. The diffuser 20 typically comprises a light diffusing apparatus formed of transparent and semi-transparent polymers. One exemplary diffuser is disclosed in commonly assigned U.S. Design Patent D487,596, however, other optical diffusers are also known to those of skill in the art, such as glass diffusers, and may be substituted accordingly without departing from the spirit or scope of the present invention.

Generally, the LED driver 12 and RGB LEDs 14 are embedded or combined on a single unit within the illumination device or may be disposed in die form within the LED driver. In this regard, the LED driver 12 and LEDs 14 are disposed to minimize space and permit optimum positioning of the LEDs 14 with respect to the diffuser 20. In one regard, an LED driver is a single application specific integrated circuit (ASIC) which minimizes space of peripherals or other discrete devices or individual microcontrollers that would otherwise be required to be placed in the illumination device 10. This feature, therefore, enables small unitary illumination devices 10, which is one unique advantage of the present invention. One embodiment of the ASIC LED driver 12 is described in more detail below.

As illustrated in FIG. 1, the illumination device is powered by four wire inputs 22 comprising voltage, V+; ground, GND; a clock input, SCL; and a data input, SDA. In this particular embodiment, the LED driver is generally controlled via $I^2C$ communications protocol commonly utilizing these four wire 22 communications and employing these designators, as known to those of skill in the art. $I^2C$ and other communications protocols are advantageous as they provide high data rate and addressing capabilities relative the individual illumination device 10, and more importantly, to a string of illumination devices 10 that comprise a decorative lighting system, as described more fully below. $I^2C$ protocol, in particular, permits universal control individual illumination devices 10 in a decorative lighting system by way of a command controller, and advantageously permits individual controller-less and autonomous designs, both described in more detail below.

FIG. 2 illustrates one possible embodiment of an ASIC LED driver 12*a* utilizing $I^2C$ communications protocol thus enabling ready implementation of the foregoing functions. However, other integrated circuits and communications protocols may be similarly manufactured within the scope of the invention without resulting in a change in the basic function to which elements of the invention are related. In fact, other communications protocols are similar in scope and purpose to the $I^2C$ protocol and may similarly be utilized when implementing the teachings of the present invention. Therefore, other integrated circuits manufactured according to the functions described herein are contemplated without departing from the spirit or scope of the invention.

Advantageously, this embodiment of a LED driver 12*a* permits the integrated circuit to be addressed on board the integrated circuit, rather than through external hardware addressing schemes. In this regard, the EEPROM 30 may store a unique address to permit the bus control register 32 to selectively parse or ignore SDA data addressed to the chip or not addressed to the chip, respectively. Alternative memory devices may be substituted and include writable and rewritable nonvolatile memory such as PROM, EEPROM, flash memory, etc. In this manner, an $I^2C$ command controller may select an illumination device with the particular LED driver 12*a* to be selectively driven to a particular state (color, blink rate, brightness, etc.) while other differently addressed illumination devices may be driven to other states. Accordingly, displays and arrays of multiple illumination devices may be universally programmed by a single microcontroller disposed on the command controller, therefore having all display subroutines centrally located and centrally controllable.

FIG. 2 also illustrates common input features associated with the $I^2C$ communication protocol including a SCL, SDA, V+, and GND inputs, described in conjunction with FIG. 1 above, and associated input filters 34 and bus control 32 for distributing data from the SDA line to an appropriate register. The integrated circuit includes pulse width modulation 40, 42 and prescaler registers 36, 38 that combine to permit blink rates of the LEDs to be selected. The prescalers 36, 38 generate the period of the PWM signal from a high frequency oscillator. First and second prescalers 36, 38 are provided to permit multiple periods. First and second PWM registers 40, 42 are also provided to generate two PWM duty cycles. Having generated two duty cycles and two periods, any LED 16*a*, 17*a*, 18*a* may be driven at any combination of the two for a desired blink rate, as desired for ornamental purposes.

Brightness is controlled by brightness registers 44 (only one shown for clarity, however, additional registers may be provided for each color LED) generating a high frequency pulse width modulated signal during the duty cycle of the blink period. The high frequency cycle is undetectable to the human eye and permits a control of the brightness by control of the duty cycle of the brightness. Brightness is a function of the average current through the LED 16*a*, 17*a*, 18*a* and varying the duty cycle of the high frequency signal therefore varies the brightness of the LED. Brightness also permits fading colors by steadily reducing the intensity or average current during the duty cycle.

It should be noted that brightness among various manufacturers of high brightness LEDs is highly variant. Manufacturers may provide current and illumination ratings for RGB LEDs, or it may be advantageous to experimentally determine RGB LED brightness. As such, the brightness register 44 permits calibration of the high frequency signal in order to vary the average current provided for a specific bulb. The LED driver 12*a* is therefore manufactured with a default value for nominal brightness and that default may be adjusted to increase or decrease nominal brightness. In this embodiment, a brightness calibration value offset from a nominal value is stored in the EEPROM 30, and one brightness calibration value may be stored for each LED 16*a*, 17*a*, 18*a*.

The combined duty cycles relating to blink rates and brightness are therefore provided to a signal generator 46 which is variably controlled by the LED select register 48. In this particular embodiment, the LED select register 48 selects either duty cycle provided by the PWM0 or PWM1 register, or alternatively may be set to drive an LED permanently on or permanently off. The signal generator 46, therefore, controls each of the MOSFET gates 50, 52, 54 to each individual red, blue, and green LED 16*a*, 17*a*, 18*a* according to the selected duty cycle and brightness. The source of each MOSFET 50, 52, 54 is therefore monitored by the input register 51 providing state parameters of each diode. While the MOSFETS of the PCA9538 described herein are typically adequate current gates, it is anticipated that many other high brightness LEDs requiring higher power ratings or other characteristics may require additional higher powered current gates. As such, additional higher-powered MOSFETS or other higher power current gates may be externally connected or internally disposed in order to drive higher power RGB LEDs or other color mixing or color tunable LED assemblies.

FIG. 3 illustrates one particular embodiment of a decorative lighting system 60 employing illumination devices 61 along a flexible cord 62 as might be used in a decorative silhouette display, three dimensional display, etc. A command controller 63 comprises a power supply and $I^2C$ command generating microcontroller connected along a flexible cord 62 to a bus, such as previously described. Along this cord 62, a plurality of $I^2C$ illumination devices 61 are arranged in a light line configuration similar in general appearance to a traditional Christmas bulb strand. Each illumination device 61 on the strand illustrated may embody the illumination device such as shown and previously described in conjunction with FIG. 1, however, other similar illumination devices may be substituted. Due to capacitive performance constraints of long flexible cord 62 busses used in conjunction with the $I^2C$ communication protocol, the cord 62 may be divided by a repeater 64 to permit additional illumination devices. For example, in one embodiment it is expected that a maximum of 100 illumination devices may be disposed on a flexible cord 62. Therefore, to facilitate the expansion of the flexible cord bus to more than 100 bulbs, an $I^2C$ command repeater 64 is affixed to the end of every 75–100 solid-state bulbs in a given system 60. As such, a repeater 64 may be disposed consecutively along the flexible cord bus as many times as necessary to achieve a given number of illumination devices in the system 60.

The illumination devices 61 depicted in FIG. 3 are addressed numerically such as by way of the EEPROM described in conjunction with FIG. 2. This particular embodiment typically uses the $I^2C$ 7-bit addressing scheme that allows for addresses for each illumination device of up to 127 addresses. Therefore, the command controller 63 may selectively command each individually addressed illumination device 61 to a particular blink rate, color, and brightness. Alternatively, the illumination devices 61 may be addressed in groups, such as providing an identical address to multiple illumination devices 61 such that they each respond to the same data. Therefore, each illumination device 61 in a decorative lighting system 60 may either share a common operational address and then react to a group call signal from the command controller 63. In other embodiments it may be advantageous to link sub-addresses to certain calls for controlling groups. As such, a group of addresses need not have identical addresses but sub-addresses uniquely responsive to a group function. Similarly, these two schemes of lighting may be used in conjunction with one another having both individually addressed illuminations devices, group addressed illumination devices, and sub-addressed illumination devices. Controlling elements of an $I^2C$ communications system in this manner is known to those of ordinary skill in the art documented in the $I^2C$ Bus Specification, Version 2.1, January 2000, published by Philips Semiconductor, and is herein incorporated by reference. Therefore, the teachings of this invention advance the $I^2C$ protocol advantages and implementation with respect to illumination devices and decorative lighting system, heretofore unknown to those of ordinary skill.

Other more complex embodiments of a decorative lighting system 70 are expected, and FIG. 4 is one example illustrating multiple command controllers 73*a*, 73*b*, repeaters 74, and multiplexers 76 in conjunction with a command controller. In this regard, the command controllers 73 work cooperatively with adjacent flexible cord busses 72 of illumination devices. From a single command controller 73*a*, multiple parallel busses of illumination devices may be addressed and selected via multiplexer 76 rather than repeaters for parallel control of particular lines. Furthermore, these individual lines may be addressed and include repeaters 74, such as described in conjunction with FIG. 3.

Another alternative embodiment of the decorative lighting system and illumination device advantageously utilizes the most recent advances of the $I^2C$ protocol, such as 10-bit addressing system, which permits up to 1023 addresses to be arrayed along a flexible cord bus. Therefore, in applications requiring thousands of illumination devices, the system may permit utilizing far greater numbers of individual control and addressability, thus improving the size and complexity available for decorative displays. The 10-bit addressing scheme may be implemented in the same manner as described with the 7-bit addressing scheme above. Even more advantageously, the $I^2C$ 10-bit addressing scheme is also compatible with the 7-bit addressing scheme. In this regard, illumination devices incorporated into a 7-bit system may be added or modified with additional illumination devices in a 10-bit system without any additional change to the existing 7-bit illumination devices. The 10-bit addressing scheme is documented in $I^2C$ Bus Specification, herein incorporated by reference with respect to 10-bit addressing.

The $I^2C$ communications protocol and an ASIC LED driver 12, as described above, also advantageously permit addressing and illumination device control in the absence of a command controller. In this embodiment, each illumination device may be preprogrammed to a color, blink rate, and brightness, or a pattern of preprogrammed colors, brightness, blink rates, etc., in individual memory registers. As such, the resulting illumination devices may be arranged along a flexible cord and supplied with power along the interconnecting bus. In this way, preprogrammed parameters cause a command controller to be unnecessary, resulting in a simpler configuration.

Returning to embodiments of a decorative lighting system that incorporate command controllers, FIG. 5 illustrates a typical command controller 63*a*. In this case the command controller 63*a* comprises a programmable microcontroller 82 powered by a DC power regulator 84 and transformer 86 and DC voltage regulator configured to accommodate AC power sources 88. An EEPROM 90 stores computer readable commands that include addressing illumination devices 10, controlling blink rates, and controlling brightness of bulbs. For example, the EEPROM 90 may store preset color and blink patterns for a universal system, requiring only simple software changes to access and thereby change the patterns of the system. A microcontroller 82, therefore reads and appropriately provides SCL and SDA signals to each of the addressed bulbs along a flexible cord bus 62*a*. A microcontroller 82 also advantageously enables on-the-fly reprogramming of the system to any desired pattern and blink configurations desired in any amount of complexity desired. In this embodiment, the serial port 92 permits external software reconfiguration thereby enabling external control or reprogramming of internal software controls. Accordingly, the type of control maintained over the system parameters may be as simple or as complex as desired. Multiple ports, such as port A 94*a* and port B 94*b* illustrated, therefore permit parallel flexible cord busses 62*a* of illumination devices 10 to be operated from a single command controller 63*a*. Additional ports may be added to such a configuration as necessary.

Multiple ports 94*a*, 94*b* and microcontroller control of this advantageous embodiment also enable the command controller to be used as a repeater, multiplexer, or hub for various strings of bulbs. The DIP switch 96 on the command controller 63*a* is a selectable input that permits changing the function asserted by the command controller 63*a*, and therefore enables various software configurations stored in the command controller memory. In this regard, the command controller 63*a* is therefore a multifunctional device and eliminates additional design requirements for stand-alone multiplexers and repeaters. Even more advantageously, the complex systems, such as depicted in FIG. 4, may be reconfigured without interchange of hardware by simply permitting switch changes on each command controller 63*a*.

An alternative embodiment of a decorative lighting system 100 is depicted in FIG. 6 and includes a 2-wire configuration on an $I^2C$ bus. In this embodiment, the SDA and SCL lines provided by a microcontroller 101 of the $I^2C$ bus are power modulated onto the DC power supply 104 by way of a modulator 106 at the command controller 63*b*. At the illumination device, therefore, a demodulator 108 is included to separate the SDA and SCL signals to be provided to the ASIC LED driver 12. A modulator and demodulator may be integral to the command controller and LED driver, respectively, or separately provided. Demodulation of communications signals may be accomplished by any number of modulation methods including frequency, amplitude, and phase modulations methods as are known to those of ordinary skill in the art.

This embodiment may also include replaceable illumination devices 10*c* and mounts along a flexible cord for replacing illumination devices. For example, standard e12 screw base connector or the like are commonly used in many ornamental displays today. The illumination device 10*c* of the present invention therefore may be disposed in a connector, such as the e12 connector, and replaced along a light line of compatible connectors. As will be recognized by one of ordinary skill in the art, this embodiment permits retrofitting older displays with illumination devices described by this invention. In this case, the illumination devices 10*c* of the invention replace previous bulbs, and the power supply may be modified with a command controller 63*b*. This is especially advantageous in large coordinated and reusable displays. In this regard, the displays do not require replacing flexible cord busses and complex patterns, rather, they permit retrofitting with illumination devices 10 and the command controller 63*b* of the present invention.

The chromaticity diagram for wavelength mixing are well known to those of ordinary skill and derived from the CIE Chromaticity diagram specifications. Charting various wavelengths of particular InGaN and AlGaN RGB LEDs on a chromaticity diagram provides a theoretical way to begin establishing the desired color mixing. By varying the brightness of each of the three LEDs, each of the three LEDs using the brightness control, previously described, the color of each bulb may be controlled about a range of colors through the spectrum. For example, by varying the brightness and, thus the combined wavelength through iterations of up to 256 pulse widths per bulb, over 16 million different shades of color can be produced. In practice, the invention may not actually require 16 million shades of color, but a select group of a few to several hundred colors may suffice to satisfy ornamental and decorative artistic palettes. As such, a preprogrammed array of hundreds of colors may be established in programmable memory, such as in a programmable logic device, within the chip (such as an EEPROM, FPGA, etc.) Alternatively, hundreds or thousands of colors may be stored in (soft) memory for programming by the command controller to each individually addressed bulb. For example, the command controller may store corresponding color commands in a data table stored in ROM. Additionally, intensity may also be monitored for variation by devices such as a phototransistor, cadmium sulfide cell, or other light measuring components. In this regard, the monitoring device may provide dynamic feedback to the LED drive for more precise color control.

The pulse width control of the present invention is linearly controlled pulse width modulation. However, as known to those of ordinary skill, it may be advantageous to provide logarithmic control to establish more precise brightness at higher duty cycles. For example, FIG. 7 illustrates the curves of LED brightness versus duty cycles for both linear and logarithmic control. In this regard, one of ordinary skill will recognize the inherent advantages and disadvantages of each with respect to a particular application, and choose accordingly.

Referring to FIG. 8, it is generally accepted that relative luminous intensity is "safely" controlled in the forward current range of 0 to 20 mA. However, pulsed applications permit higher current ranges that will not damage the LEDs, thus permitting more efficient control methods including pulse width modulation described herein. Alternatively, those of ordinary skill will also recognize that other color control methods may be substituted. Alternative methods include frequency modulation and bit angle modulation, which may be substituted without departing from the spirit or scope of the present invention.

A further embodiment of a decorative lighting system is depicted in FIGS. 9 and 10, and includes a white LED. Recent strides in LED technology have produced Zinc Selenide (ZnSe) LEDs that illuminate white light without the need to incorporate phosphors and extraneous elements to change the emitted light from another colored LED. Referring to FIG. 9, the white LED is a ZnSe LED 19 and may be controlled by the $I^2C$ bus in the same manner as the red 16 green 17 and blue LEDs 18 as previously described in conjunction with FIG. 1. In this regard, the white LED blink rate and intensity can be controlled by one additional control bit from the data bus, SDA. Referring to FIG. 10, the additional control bit in the data bus SDA is provided to a LED driver 13*b* that operates in the same manner as the LED driver 12*b* of FIG. 2, except that the LED select 48 now provides for additional selection of a fourth LED. In this regard, the LED select 48 is only limited in the number of LEDs that can be driven by the required duration duty cycles of LEDs necessary to generate substantially continuous light, as seen by the human eye, from each LED. As such, additional LEDs could be driven by the LED select as desired. It is interesting to note that with four control bits and four LEDS (such as RGBW, RGBY, RGBA) the number of color and hue variations in exponentially increased, thus permitting to over 4 billion) different color and hue variations. As the color variations are increased, the step color changes are less noticeable to the eye, appearing more gradual. Another method of expanding the numbers of color and hue variations, would include increasing the pulse width modulation resolution for each output bit. As described above pulse width 256 output levels are the norm in PWM drivers, but with continued frequency improvement, the resolution could be improved to 1024 levels in later generations of these ICs.

Several embodiments of decorative lighting system may be employed in conjunction with any of the above teachings and several examples are included. Generally, these embodiments comprise ornamental displays such as string lights, silhouettes, moving silhouettes, three dimensional displays, large area displays, tree lights and arrayed lines of replaceable light strings. Color animation of individual bulbs therefore adds exciting new capabilities to these conventional display methods and devices. Prior to the invention multiple lines of bulbs were required to be switched together to produce a "chaser" effect. Chaser effects are now possible through the internal control of color and thus permit continuous color changing increasing aesthetic appeal.

Numerous applications for the decorative lighting systems and LED drivers disclosed herein are envisioned, and some examples include applications for color changing LED indicators and illumination on electronic equipment such as VCRs, DVDs, Video Game consoles, etc. Decorative lighting applications could be employed in clusters for environmental lighting where color changeable lights are desired such as in household illumination, landscape illumination, commercial sign illumination, pool and spa lighting, etc. Backlighting applications are often used for decorative purposes appliances, toys, games, and novelty devices and would benefit from the application of the embodiment s described herein. For such applications, the color changeability could be programmed to be reactive to states of the device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A decorative lighting system, comprising:

a command controller comprising:

a microcontroller for providing a data signal and a clock signal, the data signal including instructions related to a plurality of addresses; and a power supply for providing a power signal;

a flexible cord having a first end and a second end, comprising at least two conductors capable of carrying the data signal, clock signal, and power signal, the first end being electrically connected to the command controller;

a plurality of illumination devices, each illumination device being disposed between the first end and second end of the flexible cord, each illumination device comprising:

a substrate including a first light emitting diode (LED), a second LED, and a third LED, each of the first, second, and third LEDs emitting light at a different wavelength than either of the other LEDs; and an integrated circuit LED driver being electrically interconnected via the at least two conductors to the command controller and responsive to the data signal, clock signal, and power signal for driving the first, second, and third LEDs, the integrated circuit LED driver comprising:

a plurality of pulse width modulation registers selectable in combination to drive the first LED, second LED, and third LED independent of one another to a blink rate and an intensity to control the color produced by the combination of the LEDs; and an electronically programmed address circuit for storing an address therein, the integrated circuit LED driver being responsive to the data signal upon receiving a corresponding address from the command controller.

2. The decorative lighting system according to claim 1, wherein the microcontroller provides the data signal and clock signal according to an inter-integrated circuit protocol ($I^2C$).

3. The decorative lighting system according to claim 1, wherein the microcontroller provides the power signal modulated by the data and clock signal.

4. The decorative lighting system according to claim 1, wherein the integrated circuit LED driver further comprises a brightness register interconnected to the plurality of pulse with modulation registers to at least one of the LEDs for controlling brightness by adjusting a duty cycle of current supplied to the LED.

5. The decorative lighting system according to claim 1, wherein the integrated circuit LED driver further comprises a local oscillator, and a plurality of prescalers interconnected from the local oscillator to the plurality of pulse width modulation registers to generate multiple periods of the pulse width modulation from the plurality of pulse width modulation registers.

6. The decorative lighting system according to claim 1, wherein the integrated circuit LED driver further comprises an LED select register that controls the selection in combination of the plurality of pulse width modulation registers.

7. The decorative lighting system according to claim 1, wherein the integrated circuit LED driver further comprises first, second, and third MOSFET gates interconnected to one of the plurality of pulse width modulation registers to gate current to each of the first, second and third LEDs, respectively.

8. The decorative lighting system according to claim 1, wherein the system further comprises a plurality of command controllers operable as a communication device between the plurality of illumination devices and the microcontroller.

9. The decorative lighting system according to claim 8, wherein the communication device is selected from the group consisting of bus repeaters and multiplexers.

10. The decorative lighting system according to claim 1, further comprising a fourth LED interconnected to the integrated circuit LED driver to control a blink rate and an intensity of the fourth LED.

11. The decorative lighting system according to claim 10, wherein the fourth LED is disposed on the substrate.

12. The decorative lighting system according to claim 10, wherein the fourth LED comprises a white LED.

13. A red-green-blue color managed decorative lighting system, comprising:

a command controller comprising:

a microcontroller for providing a data signal and a clock signal, the data signal including instructions related to a plurality of addresses; and a power supply for providing a power signal;

a flexible cord having a first end and a second end, comprising at least two conductors capable of carrying the data signal, clock signal, and power signal, the first end being electrically connected to the command controller;

a plurality of illumination devices, each illumination device being disposed between the first end and second end of the flexible cord, each illumination device comprising:

a substrate including a red light emitting diode (LED), a blue LED, and a green LED; and an integrated circuit LED driver being electrically interconnected via the at least two conductors to the command controller and responsive to the data signal, clock signal, and power signal for driving the red, blue, and green LEDs, the integrated circuit LED driver comprising:

a plurality of pulse width modulation registers selectable in combination to drive the red LED, blue LED, and green LED independent of one another to a blink rate and an intensity to control the color produced by the combination of the LEDs; and an electronically programmed address circuit for storing an address therein, the integrated circuit LED driver being responsive to the data signal upon receiving a corresponding address from the command controller.

14. The decorative lighting system according to claim 13, wherein the microcontroller provides the data signal and clock signal according to an inter-integrated circuit protocol ($I^2C$).

15. The decorative lighting system according to claim 13, wherein the microcontroller provides the power signal modulated by the data and clock signal.

16. The decorative lighting system according to claim 13, wherein the integrated circuit LED driver further comprises a brightness register interconnected to the plurality of pulse with modulation registers to at least one of the LEDs for controlling brightness by adjusting a duty cycle of current supplied to the LED.

17. The decorative lighting system according to claim 13, wherein the integrated circuit LED driver further comprises a local oscillator, and a plurality of prescalers interconnected from the local oscillator to the plurality of pulse width modulation registers to generate multiple periods of the pulse width modulation from the plurality of pulse width modulation registers.

18. The decorative lighting system according to claim 13, wherein the integrated circuit LED driver further comprises an LED select register that controls the selection in combination of the plurality of pulse width modulation registers.

19. The decorative lighting system according to claim 13, wherein the integrated circuit LED driver further comprises first, second, and third MOSFET gates interconnected to one of the plurality of pulse width modulation registers to gate current to each of the red, green and blue LEDs, respectively.

20. The decorative lighting system according to claim 13, wherein the system further comprises a plurality of command controllers operable as a communication device between the plurality of illumination devices and the microcontroller.

21. The decorative lighting system according to claim 20, wherein the communication device is selected from the group consisting of bus repeaters and multiplexers.

22. The decorative lighting system according to claim 13, further comprising a white LED interconnected to the integrated circuit LED driver to control a blink rate and an intensity of the fourth LED.

23. The decorative lighting system according to claim 22, wherein the white LED is disposed on the substrate.

24. The decorative lighting system according to claim 22, wherein the white LED comprises a zinc selenide LED.

* * * * *